Aug. 17, 1948.  A. A. KUCHER  2,447,348
HYDRAULIC DRIVE
Filed May 21, 1943  2 Sheets-Sheet 1
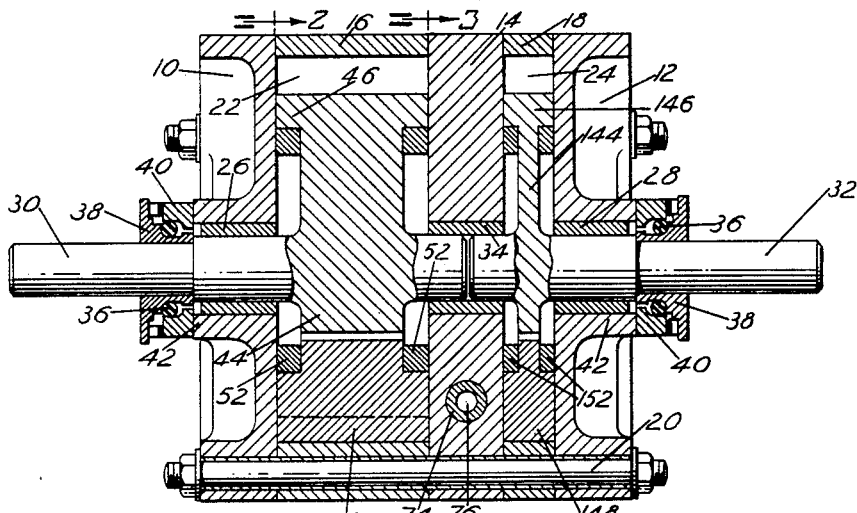
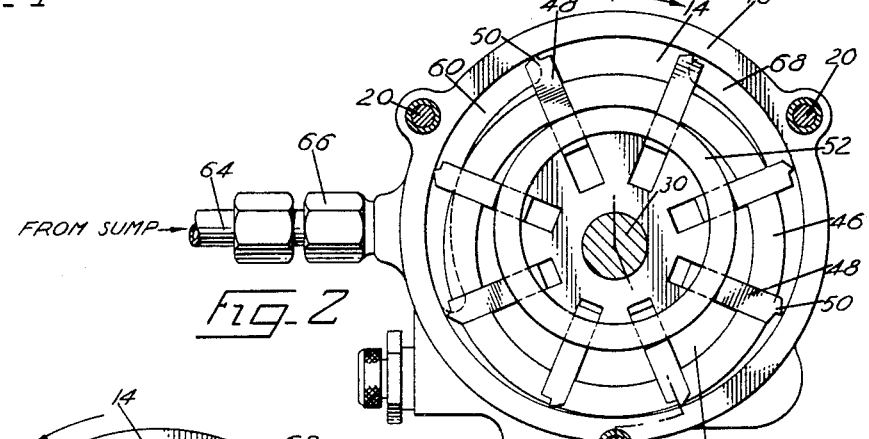
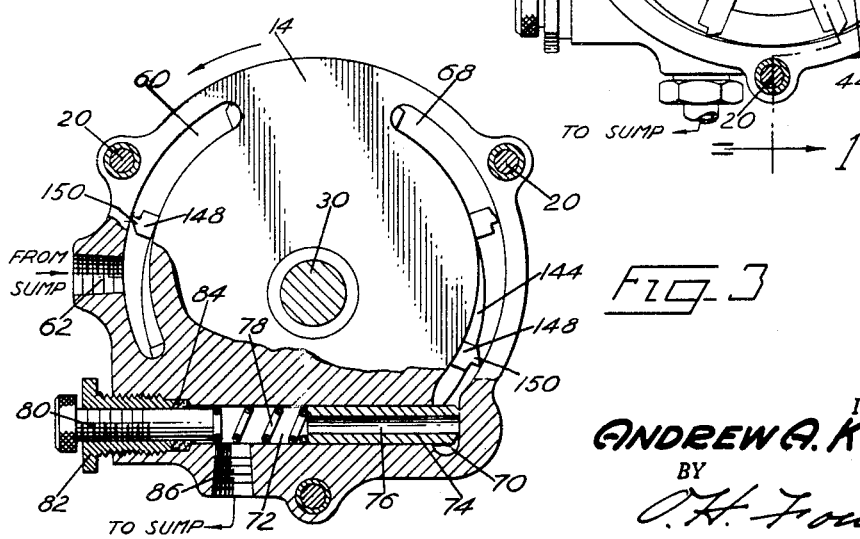
INVENTOR.
ANDREW A. KUCHER
BY
O. H. Fowler
ATTORNEY.

Aug. 17, 1948.   A. A. KUCHER   2,447,348
HYDRAULIC DRIVE
Filed May 21, 1943   2 Sheets-Sheet 2
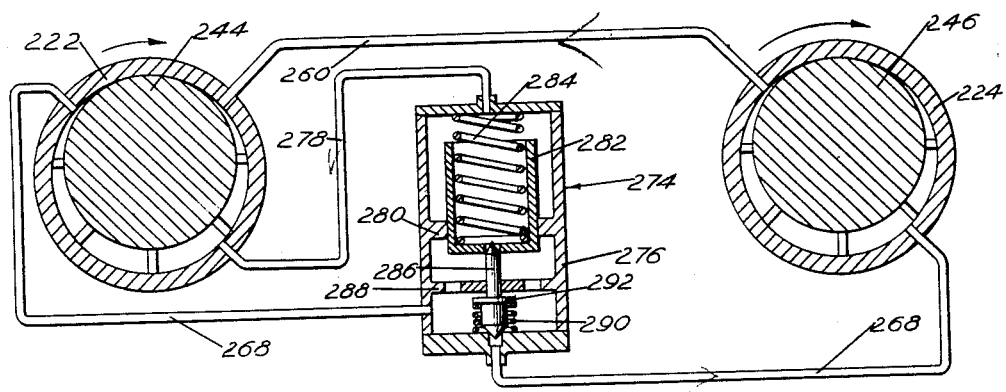
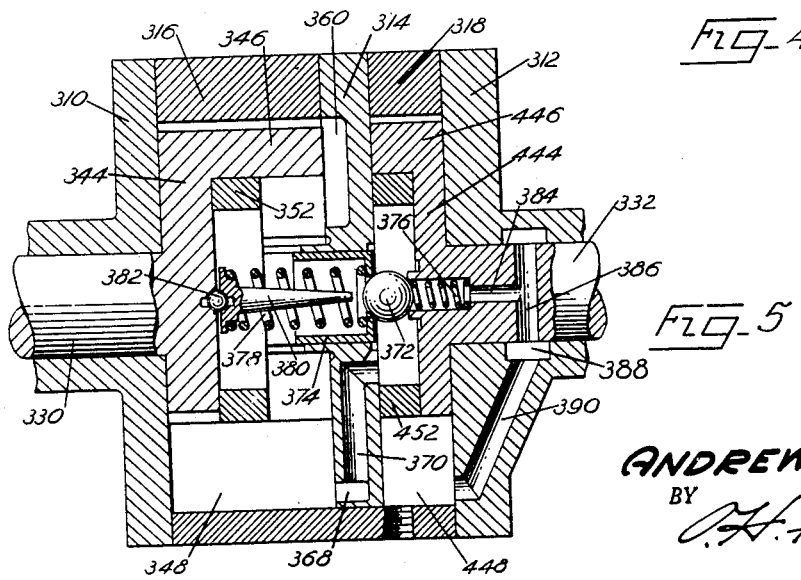
INVENTOR.
ANDREW A. KUCHER
BY
ATTORNEY.

Patented Aug. 17, 1948

2,447,348

UNITED STATES PATENT OFFICE 2,447,348

HYDRAULIC DRIVE

Andrew A. Kucher, Grosse Pointe Farms, Mich., assignor to Bendix Aviation Corporation, Detroit, Mich., a corporation of Delaware Application May 21, 1943, Serial No. 487,953

10 Claims. (Cl. 60—53)

This invention relates to hydraulic drives. Broadly the invention comprehends a hydraulic drive having a pump driven by the engine, and a hydraulic motor driven by the pump under the control of means automatically varying the driving effect of the pump on the motor to give the motor a substantially constant output torque.

An important object is to provide a compact drive unit which may be readily manufactured. To this end the unit is provided with pump and motor chambers arranged side by side and separated by a partition having therein intake and outlet passages.

Various important subsidiary features relate to the construction and arrangement of the control valve, and to the manner in which it controls a by-pass for the fluid in excess of that providing the desired pressure in the motor.

The above and other objects and features of the invention will be apparent from the following description of the illustrative constructions and arrangements shown in the accompanying drawings, in which:

Figure 1 is a section through one particular drive unit, on line 1—1 of Fig. 2;

Figure 2 and Figure 3 are sections respectively on the lines 2—2 and 3—3 of Figure 1;

Figures 4 and 5 are diagrammatic sections showing two alternative valve constructions.

In the hydraulic drive illustrated in Figs. 1 to 3, there is a sectional housing shown as comprising end plates 10 and 12, a partition 14, and cylindrical members 16 and 18, clamped together by means such as tie-rods 20 to provide cylindrical pump and motor chambers 22 and 24 arranged side by side in the housing. The end plates 10 and 12 carry bearings 26 and 28 for driving and driven shafts 30 and 32, which revolve in opposite directions, and the adjacent ends of the shafts are journaled in a bearing 34 carried by the partition 14.

The shafts 30 and 32 are coaxial with respect to the pump and motor chambers 22 and 24. The end plates are engaged by liquid seals including rubber rings 36 mounted on retaining collars 38 pressed on the shafts, and engaged by sealing rings 40 spring-pressed against the ends of bosses 42 on the end plates.

The driving shaft 30 has thereon, a rotor 44 having a peripheral flange 46 eccentric with respect to the axis of the shaft and of the pump chamber 22. This flange, and the rotor, are provided with radial slots receiving vanes 48, each having approximately centrally of its outer end a transverse lip 50 facing in the direction of the pressure on the vane.

Inside of the flange 46, the vanes 48 have in their sides slots for the reception of two retainer rings 52, the outer walls of these slots being curved on arcs having their centers at the transverse lips 50, so that the vanes may rock slightly on the rings 52. This permits the use of thinner vanes than heretofore used in pumps of this type.

It will be seen that the rings 52 and the vanes 48 turn as a unit in the pump chamber 22, as the shaft 30 is rotated, without any radial movement, the eccentric rotor 44 constantly changes the volumetric capacity between adjacent vanes as the shaft turns. The vanes 48 rock very slightly on the rings 52 during the rotation of the shaft.

The driven shaft 32 has thereon an eccentric rotor 144 provided with a peripheral flange 146, slotted to receive vanes 148 having transverse lips 150 facing in the direction of the pressure on the vanes. The vanes receive and rock slightly upon retainer rings 152, similar to the construction and operation of the corresponding parts of the pump. The shaft 32, and the parts carried thereby, turn in a direction opposite to that of the corresponding pump parts, as indicated by the arrows in Figures 2 and 3.

In the particular structure illustrated, it is desired that the shaft 32 be driven at a considerably higher speed than the shaft 30, and consequently the pump rotor and parts carried thereby are much greater in width than the corresponding motor parts.

An arcuate opening 60 through the partition 14, approximately 90° in length, provides an intake passage for the pump and an outlet passage for the motor, allowing liquid discharged from the motor to be delivered directly to the pump. An auxiliary intake 62 opens directly into the opening 60 (Fig. 3) from a connection 64 (Fig. 2) leading from a sump (not shown) or equivalent reservoir for excess and reserve liquid. The connection 64 is controlled by a conventional check valve 66, opening toward the motor chamber 60.

At the opposite side of the partition 14 is another arcuate passage 68, serving as an outlet for the pump and as an intake for the motor. This passage extends into a pocket 70, communicating with a valve cylinder 72 in the base of the partition. The cylinder 72 contains an automatic control valve piston 74 having an axial passage 76 therethrough. The end of the valve 74 is beveled to provide (first) a line contact with the wall of the pocket 70, and (second) an annular piston surface exposed to the pressure of the liquid in the pocket 70.

This pressure tends to unseat the valve more or less, against the resistance of a valve spring 78. The tension of the spring 78 can be adjusted by a screw 80 mounted in a bushing 82 which also serves to compress a packing 84. Liquid admitted by the unseating of the valve 74 passes through the passage 76, and flows through an opening 86 and a suitable conduit (not shown) to the sump or reservoir, from which the connection 64 returns it to the pump under control of the check valve 66.

It will be seen that, by suitably adjusting the tension of the spring 78, the pressure of the liquid driving the motor can be maintained substantially constant, giving the motor a substantially constant output torque regardless of the fluctuations in speed of the engine or other power source driving the shaft 30.

Further, since the pump has a much larger volumetric capacity than the motor, the motor will still be driven at this same output torque even if the engine should be running at reduced speed.

Figure 4 illustrates diagrammatically another embodiment of constant output torque drive, in which the vaned pump rotor 244 is arranged in a suitable pump housing or chamber 222, and drives a vaned motor rotor 246 in the motor housing or chamber 224.

The outlet of the motor is connected to the intake of the pump by a passage or connection 260. The outlet of the pump is connected to the intake of the motor by a passage or connection 268 controlled by an automatic valve 274. These parts may of course actually be arranged as in Figures 1 to 3, with the valve 274 mounted in the partition 14.

The valve 274, as illustrated, comprises a valve casing 276, the upper end of which communicates by a by-pass or connection 278 with the intake side of the pump. Within the valve casing 276 is a transverse partition 280 having an opening forming in effect a cylinder receiving a control piston 282 urged downwardly by a valve spring 284. The head of the piston 282 is formed centrally with a by-pass opening normally closed by the upper conical end of a valve member 286, guided vertically in a cross-member 288. The valve member 286 is formed at its lower end with an enlarged portion conically formed as a valve seating in an opening in the bottom of the valve casing leading to the intake side of the motor. The valve member is urged upwardly by a spring 290, very light as compared to the spring 284, and which engages a collar 292 on the valve member.

It will be seen that the spring 290 constrains the valve member 286 to follow the piston 282 upwardly when the pump is first started, until the collar 292 seats against the partition 288. Thereafter excessive pressure from the pump causes the piston 282 to move upwardly more or less, to control the by-pass opening in the head of the piston, to meter the liquid by-passed back to the pump. When the speed of the pump drops sufficiently, the spring 284 balances against the spring 290 until a point is reached where the passage to the motor is entirely cut off. This is the normal position when the pump is not running.

Figure 5 shows a unit in a casing comprising end plates 310 and 312, and a partition 314 between cylinders 316 and 318. Shafts 330 and 332 are provided with rotors 344 and 444 having outer eccentric flanges 346 and 446, and with vanes 348 and 448 held by retainer rings 352 and 452. The construction differs from that of Figs. 1 to 3 in that the end of the pump intake passage 360 extends inwardly to communicate with the central space within the flange 346, and the end of the pump outlet passage 368 is connected by a passage 370 with the space within the flange 446.

The inlet passage 360 of the pump for about 90° of its length extends through the partition 314, and forms the exhaust passage for the motor. The outlet pump passage 368, also approximately 90° long, does not, however, extend through the partition in this case, but supplies liquid to the motor through the passage 370. The liquid, under pressure from the pump, acts on a ball valve 372 and on the head of a valve piston 374 having an opening forming a seat on which the ball 372 is normally held by a light spring 376. The liquid forces the valve piston 374 and the ball valve 372 to the left against the resistance of a calibrated regulator spring 378, which engages a retainer 380 seated against a thrust ball 382 engaging the end of the shaft 330.

This opens a passage 384 in shaft 332 communicating by a cross-passage 386 with an annular groove 388 from which opens a passage 390 leading to an arcuate motor inlet passage of approximately 90° formed in the end plate 312. As soon, however, as fluid at the desired pressure is flowing through the passage 384, any increase in pressure will unseat the ball valve 372 by engagement with the end of the member 380 acting as a stop or abutment, and the increased pressure forcing the valve piston 374 still further to the left opens the opening in the head of the piston. The excess fluid by-passes into the space inside the flange 346, and thence by passage 360 back to the intake of the pump. Thus fluid at constant pressure is supplied to the motor, which therefore is driven with a constant output torque.

While certain constructions and arrangements have been described above in detail, it is not my intention to limit the scope of my invention by that description, or otherwise than by the terms of the appended claims.

I claim:

1. A hydraulic drive device comprising a power-driven pump having an intake and an outlet, a motor having an intake with a connection to the outlet of the pump and an outlet with a connection to the intake of the pump, whereby the motor is driven by the pump, a by-pass connecting the intake of the pump with the connection between the outlet of the pump and the intake of the motor, and a valve responsive to the outlet pressure of the pump and automatically controlling the by-pass to maintain a substantially uniform pressure at the motor intake, said by-pass leading through a sump containing a reserve supply of operating liquid.

2. A hydraulic drive device comprising a power-driven pump having an intake and an outlet, a motor having an intake with a connection to the outlet of the pump and an outlet with a connection to the intake of the pump, whereby the motor is driven by the pump, a by-pass connecting the intake of the pump with the connection between the outlet of the pump and the intake of the motor, and a valve responsive to the outlet pressure of the pump and automatically controlling the by-pass to maintain a substantially uniform pressure at the motor intake, said by-pass leading through a sump containing a reserve supply of operating liquid and having a check valve opening toward the intake of the pump.

3. A hydraulic drive device comprising coaxial oppositely rotating driving and driven shafts arranged end to end, a casing into which the adjacent ends of the shafts project and which has end walls in which the shafts are journaled and which has a transverse interior partition dividing the interior of the casing into a pump chamber and a motor chamber and in which partition the adjacent ends of the shafts are journaled, a vaned pump rotor on the driving shaft within the pump chamber, a vaned motor rotor on the driven shaft within the motor chamber, said partition having passages therethrough at its opposite sides, one of which forms the intake of the pump chamber and the outlet of the motor chamber and the other of which forms the intake of the motor chamber and the outlet of the pump chamber, and a control valve mounted in said partition and communicating with the second of said passages and which is automatically controlled by the pressure in the outlet of the pump chamber to by-pass liquid in such a manner as to maintain a substantially constant pressure in the intake to the motor chamber.

4. A hydraulic drive device comprising driving and driven shafts, a casing into which the adjacent ends of the shafts project and which has a transverse interior partition dividing the interior of the casing into a pump chamber and a motor chamber, a vaned pump rotor on the driving shaft within the pump chamber, a vaned motor rotor on the driven shaft within the motor chamber, said partition having passages therethrough at its opposite sides one of which forms the intake of the pump chamber and the outlet of the motor chamber and the other of which forms the intake of the motor chamber and the outlet of the pump chamber, and a control valve mounted in said partition and communicating with the second of said passages and which is automatically controlled by the pressure in the outlet of the pump chamber to by-pass liquid in such a manner as to maintain a substantially constant pressure in the intake to the motor chamber.

5. A hydraulic drive device comprising driving and driven shafts, a casing into which the adjacent ends of the shafts project and which has a transverse interior partition dividing the interior of the casing into a pump chamber and a motor chamber, a vaned pump rotor on the driving shaft within the pump chamber, a vaned motor rotor on the driven shaft within the motor chamber, said partition having passages therethrough at its opposite sides one of which forms the intake of the pump chamber and the outlet of the motor chamber and the other of which forms the intake of the motor chamber and the outlet of the pump chamber, and a control valve mounted in said partition and communicating with the second of said passages and which is automatically controlled by the pressure in the outlet of the pump chamber to by-pass liquid in such a manner as to maintain a substantially constant pressure in the intake to the motor chamber, together with means for adjusting said control valve to change the pressure in said motor chamber.

6. A hydraulic drive device comprising coaxial oppositely-rotating driving and driven shafts arranged end to end, a casing into which the adjacent ends of the shafts project and which has end walls in which the shafts are journaled and which has a transverse interior partition dividing the interior of the casing into a pump chamber and a motor chamber and in which partition the adjacent ends of the shafts are journaled, a vaned pump rotor on the driving shaft within the pump chamber, a vaned motor rotor on the driven shaft within the motor chamber, said partition having passages therethrough at its opposite sides, one of which forms the intake of the pump chamber and the outlet of the motor chamber and the other of which forms the intake of the motor chamber and the outlet of the pump chamber, and a control valve mounted in said partition and communicating with the second of said passages and which is automatically controlled by the pressure in the outlet of the pump chamber to by-pass liquid in such manner as to maintain a substantially constant pressure in the intake to the motor chamber, said casing having an auxiliary intake for the pump chamber adapted to receive liquid from a sump into which liquid from said by-pass control valve empties and which auxiliary intake is provided with and controlled by a check-valve opening toward said pump chamber.

7. A hydraulic drive device comprising driving and driven shafts, a casing into which the adjacent ends of the shafts project and which has a transverse interior partition dividing the interior of the casing into a pump chamber and a motor chamber, a vaned pump rotor on the driving shaft within the pump chamber, a vaned motor rotor on the driven shaft within the motor chamber, said partition having passages therethrough at its opposite sides one of which forms the intake of the pump chamber and the outlet of the motor chamber and the other of which forms the intake of the motor chamber and the outlet of the pump chamber, and a control valve mounted in said partition and communicating with the second of said passages and which is automatically controlled by the pressure in the outlet of the pump chamber to by-pass liquid in such a manner as to maintain a substantially constant pressure in the intake to the motor chamber, said casing having an auxiliary intake for the pump chamber adapted to receive liquid from a sump into which liquid from said by-pass control valve empties and which auxiliary intake is provided with and controlled by a check-valve opening toward said pump chamber.

8. A hydraulic drive device comprising a power-driven pump and a hydraulic motor arranged side by side and having passages the first of which connects the outlet of the motor to the intake of the pump and the second of which connects the outlet of the pump to the intake of the motor, and an adjustable automatic valve connected to the second passage and by-passing liquid therefrom to control the pressure of the liquid driving the motor, said automatic valve being controlled by the outlet pressure of the pump in such a manner as to give a different constant pressure value for the liquid driving said motor for each different setting of the valve.

9. In a hydraulic drive device having a power-driven pump and a hydraulic motor having an intake connection from the pump outlet and an outlet connection leading to the pump intake, an automatic valve controlling the first of said connections and comprising a piston having an opening axially therethrough and which is subject to the outlet pressure of the pump, a part for closing the opening on the side toward the motor intake, and a spring urging the piston toward said part and resisting movement of the piston due to said pump pressure, to by-pass through the piston a varying quantity of liquid to maintain a substantially uniform pressure in the motor.

10. In a hydraulic drive device having a power-driven pump and a hydraulic motor having an intake connection from the pump outlet and an outlet connection leading to the pump intake, an automatic valve controlling the first of said connections and comprising a piston having an opening axially therethrough and which is subject to the outlet pressure of the pump, a part for closing the opening on the side toward the motor intake, and a spring urging the piston toward said part and resisting movement of the piston due to said pump pressure, to by-pass through the piston a varying quantity of liquid to maintain a substantially uniform pressure in the motor, said part constituting a wall of said motor-intake connection, and said piston having its end beveled to form an annular surface subject to the pressure in said motor-intake connection.

ANDREW A. KUCHER.

REFERENCES CITED

The following references are of record in the file of this patent:

UNITED STATES PATENTS

| Number | Name | Date |
| --- | --- | --- |
| 743,484 | Gerdes | Nov. 10, 1903 |
| 1,385,840 | Manly | July 26, 1921 |
| 1,505,982 | Traudt | Aug. 26, 1924 |
| 1,562,663 | Strong | Nov. 24, 1925 |
| 1,711,967 | Robson | May 7, 1929 |
| 1,779,160 | Diehl | Oct. 21, 1930 |
| 1,779,162 | Evers et al. | Oct. 21, 1930 |
| 1,787,565 | Brown | Jan. 6, 1931 |
| 1,881,471 | Gerling | Oct. 11, 1932 |
| 2,082,473 | Tyler | June 1, 1937 |
| 2,148,277 | Rose | Feb. 21, 1939 |
| 2,223,715 | Berger | Dec. 3, 1940 |
| 2,226,481 | Rose | Dec. 24, 1940 |

FOREIGN PATENTS

| Number | Country | Date |
| --- | --- | --- |
| 12,213 | Great Britain | May 28, 1903 |